Feb. 19, 1963   J. M. SLATER ET AL   3,077,782
INERTIAL VELOCITY METER

Filed April 2, 1956   3 Sheets-Sheet 1

INVENTORS.
JOHN M. SLATER
DOYLE E. WILCOX
DARWIN L. FREEBAIRN, Jr.
BY WALTER L. PONDROM, Jr.

ATTORNEY

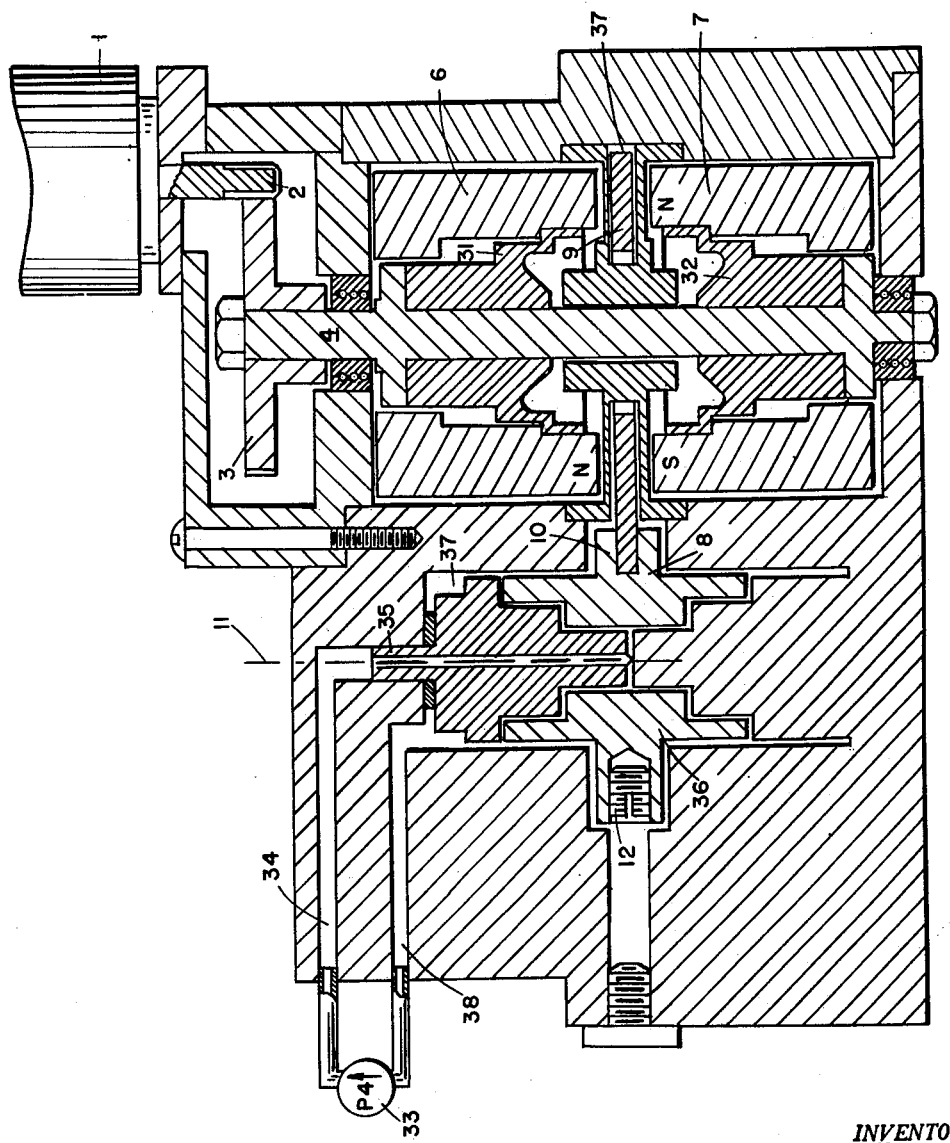

Feb. 19, 1963    J. M. SLATER ET AL    3,077,782
INERTIAL VELOCITY METER
Filed April 2, 1956    3 Sheets-Sheet 3
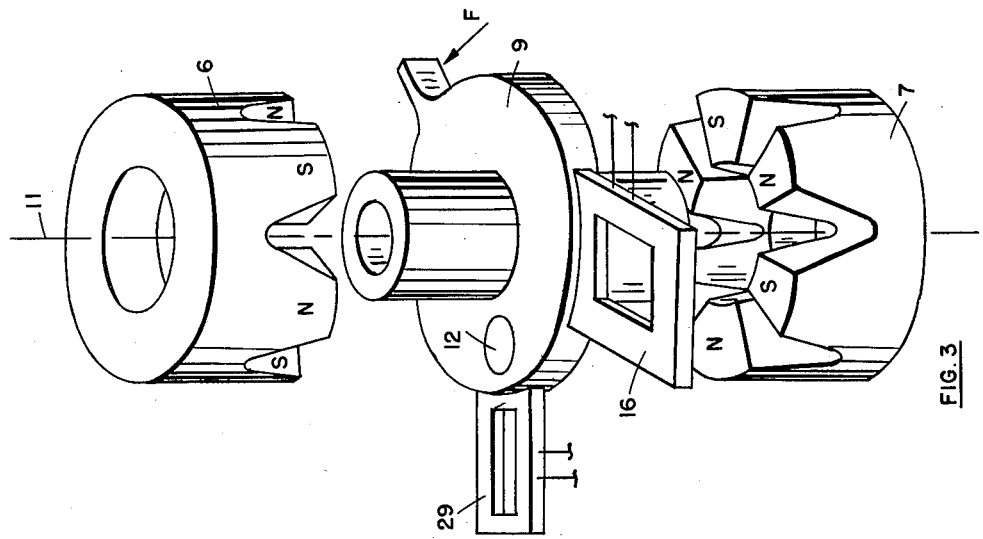
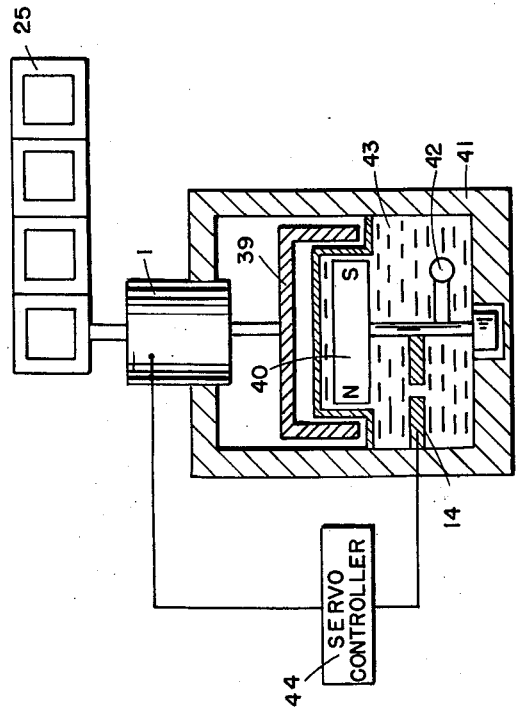
INVENTORS.
JOHN M. SLATER
DOYLE E. WILCOX
BY DARWIN L. FREEBAIRN, Jr.
WALTER L. PONDROM, Jr.
William L. Pane
ATTORNEY

United States Patent Office 3,077,782
Patented Feb. 19, 1963

3,077,782
INERTIAL VELOCITY METER
John M. Slater, Fullerton, Doyle E. Wilcox, Puente, and Darwin L. Freebairn, Jr., and Walter L. Pondrom, Jr., Whittier, Calif., assignors to North American Aviation, Inc.
Filed Apr. 2, 1956, Ser. No. 575,668
17 Claims. (Cl. 73—497)

This invention relates to a force integrating device, more particularly, a meter for indicating velocity by integrating the accelerations experienced by a mass. It indicates velocity by a shaft position.

A device which can provide an indication of velocity of integration of accelerations is desirable in autonavigation as well as in vehicle control. Many types of vehicles, such as ships or aircraft, preferably have self-contained navigational systems which require no outside contact either physically or by radiation. The inertial velocity meter is such a device. It is sensitive to accelerations and provides accurate integration of the accelerations to indicate velocity. It is, therefore, a useful instrument for navigation and vehicular control.

According to the laws of physics, the acceleration of every mass is proportional to the force upon it. As a vehicle accelerates, the inertial force acting on an eccentrically mounted mass therein will tend to deflect it with respect to the vehicle, and an equal and opposite force is required to maintain the mass in an undeflected position. Integration with respect to time of the force required to maintain the mass in an undeflected position provides the first integral of the acceleration experienced by the vehicle. Assuming that corrections have been made for any component of the acceleration of gravity g, or other disturbing acceleration, the first integral of measured acceleration is vehicle velocity. The device of the invention operates to integrate the forces required to maintain the mass in an undeflected position and thus indicates velocity.

Accelerometers combined with single and double integrators have previously been devised to provide outputs proportional to velocity and distance, respectively. In many cases, these devices are extremely complicated, difficult to construct (requiring precision fabrication and assembly) and are highly sensitive to vibrations, loading, temperature changes and other extraneous environmental conditions. It is desired that problems, such as these, be overcome in order to obtain sufficient accuracy of operation under actual conditions of use. It is further desirable that the inertial device have a quick time response in order that information does not appreciably lag any change of velocity.

Accelerometer systems, which utilize electronic integrating circuits, are not as accurate as the device taught herein. The device of this invention is, further, mechanically simpler in construction and operation. It is also inherently rugged by virtue of being composed of a small number of simple parts.

It is therefore an object of this invention to provide an improved inertial velocity meter.

It is another object of this invention to provide an inertial velocity meter which is relatively simpler and more economical than hitherto known instruments.

It is another object of this invention to provide a velocity meter requiring no electronic integration, though susceptible of use in conjunction with such method when desired.

It is still another object of this invention to provide an improved velocity meter which compensates for variation in ambient conditions.

Still another object of this invention is to provide a device providing the first integral of its input.

It is still a further object of this invention to provide a velocity indicating system which indicates the integration of accelerations experienced by a mass.

An additional object of this invention is to provide an electromechanical device adapted to obtain the first integral of the forces experienced by a pivotal mass.

It is still another object of this invention to restrain a pivotal mass by magnetic induction so as to hold it in substantially undeflected position.

Other objects of this invention will become apparent from the following description taken in connection with the accompanying drawings, in which FIG. 1 is a drawing of the velocity meter connected in a servo loop;

FIG. 2 is a cross section of a typical embodiment of the device of the invention;

FIG. 3 is an illustration of the device used as an integrator;

Figure 1:
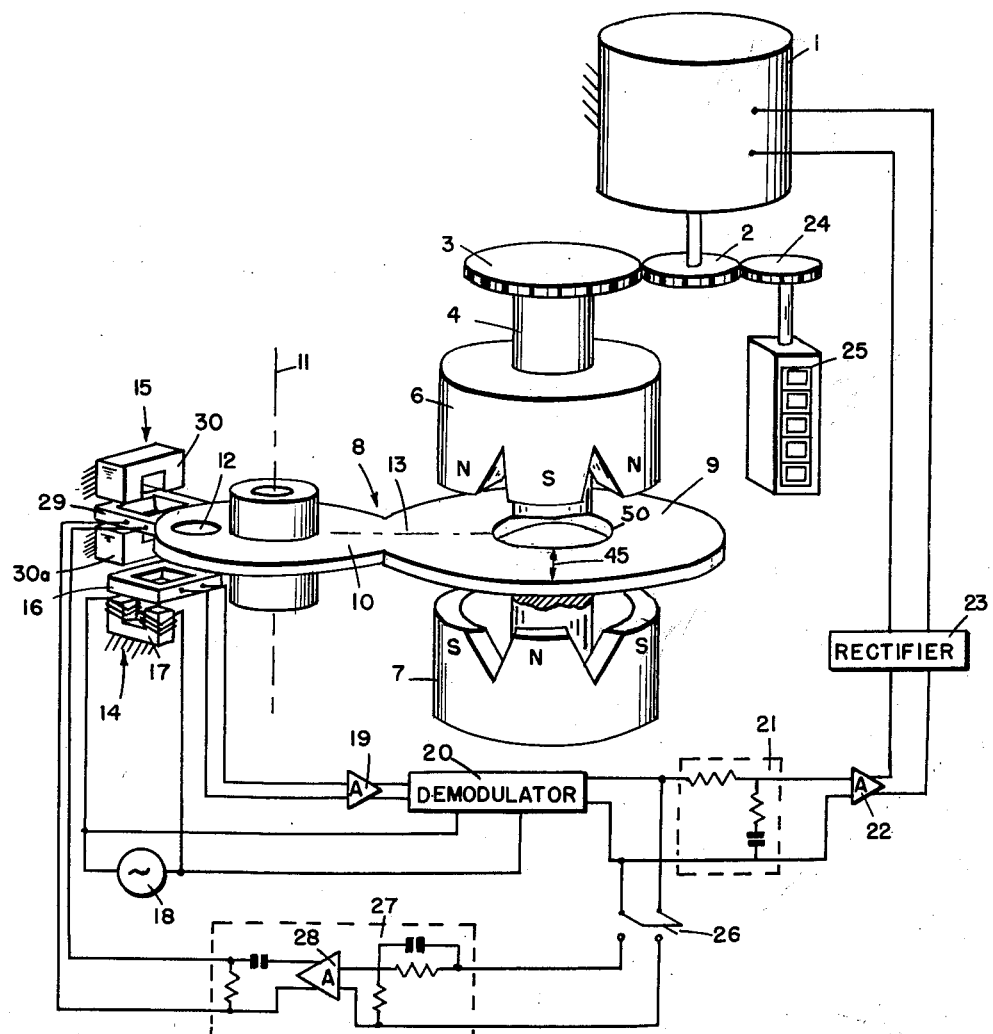

And FIG. 4 illustrates an alternate embodiment in sketch form.

FIG. 1 illustrates the basic idea of the velocity meter portion of the device and its servo loop. A rotary servo motor 1 drives gear 2 and gear 3 which act through shaft 4 to drive rotating multi-pole magnets 6 and 7 which are disposed in close proximity to a low-inertia, pivotal mass 8 comprising an eddy-current disc 9. In this illustration, pivotal mass 8 is eccentrically mounted relative to axis 11 and, therefore, subjected to a torque about axis 11 under acceleration. Disc 9 is made of copper, aluminum, or some other conductive material which is preferably not ferromagnetic. It is connected to disc 10 which is mounted by a low friction bearing so as to pivot about line 11. Hole 50 in disc 9 is large enough to allow the passage therethrough of shaft 4. Hole 50 is larger than shaft 4 and therefore allows a small amount of motion by disc 9 around axis 11. Inasmuch as disc 9 will be deterred from deflection by a servo loop, explained hereinafter, the clearance between shaft 4 and hole 50 need not be very large. Counterweight 12 is inserted in disc 10 for adjustment of the pendulosity of mass 8. Mass 8, mounted to rotate about axis 11 with a minimum of friction, deflects about axis 11 upon any acceleration in the sensitive direction. The sensitive direction, illustrated by arrow 45, is orthogonal to axes 11 and 13.

Situated so as to cooperate with pivotal mass 8 are a pickoff 14 and a torquer 15. The flat-wound, or pancake, coil 16 of pickoff 14 is connected to disc 10 of pivotal mass 8. The electromagnetic element 17, a C-shaped armature with a pair of oppositely wound coils, comprises the other element of pickoff 14. The electromagnetic element 17 is excited by A.-C. source 18. After an initial adjustment, pancake coil 16 lies symmetrically in the field of element 17 and no output signal is sent to amplifier 19. Upon any deflection of pivotal mass 8, such as is caused by acceleration, pickoff coil 16 moves with respect to element 17 and a voltage is induced which is received by amplifier 19. If coil 16 deflects in one direction with respect to element 17, amplifier 19 receives a signal in a particular phase. If coil 16 deflects in the opposite direction with respect to electromagnetic element 17, amplifier 19 receives a signal of the opposite phase. Phase-sensitive demodulator 20 receives the output of amplifier 19 and also the output of A.-C. source 18 to provide a varying D.-C. output signal which varies in accordance with the deflection of pivotal mass 8. By reason of the low friction mounting and the low inertia of mass 8, pickoff frequencies up to several hundred cycles per second may be received and demodulated by demodulator 20. A frequency compensation network 21 is connected to receive the output of demodulator 20. The output signal of network 21 passes first through A.-C., magnetic amplifier 22 and then phasesynchronized rectifier 23 and is applied to motor 1, which in this case is a D.-C. motor. Amplifier 22 and rectifier 23 may be replaced with a D.-C. amplifier having a reversible output. Motor 1 rotates, therefore, according to deflections of mass 8 and causes multi-pole magnets 6 and 7 to spin rapidly and induce eddy-currents in disc 9. These currents provide a force couple and restore mass 8 to an undeflected position. Due to the quick time response of motor 1, mass 8 will be maintained substantially in an undeflected position. At the moderate speeds (a few revolutions per second) which prevail in use, the force couple, or drag, developed on disc 9 is directly proportional to the speed of the magnets.

Compensation network 21 and the various other elements of the circuit form a closed loop servo control system which is designed according to well-known principles of servomechanisms. Network 21, illustrated as a lag network, is designed particularly to provide suitable gain at the lower frequencies in order to provide suitable response and stability to the servo system. In certain design instances, network 21 may not be required in order to obtain stability. Gear 24, driven by gear 2, is connected to provide an input to counter 25, which counts the rotations of D.-C. motor 1 and provides a direct reading of the velocity.

Because of the inertia of the motor, magnets and gears, the high frequency deflections of mass 8 cannot be followed and countered by the rotation of motor 1, these frequencies being above the response of the servo loop. These deflections are extremely undesirable because upon any deflection, the pivotal mass becomes sensitive to accelerations along axis 13, in addition to those previously described. It is therefore desirable, for greater accuracy, to maintain mass 8 at a null position along axis 13 even at high frequencies, and an additional servo loop utilizes torquer 15 to accomplish this purpose. Switch 26, when thrown, connects the output of demodulator 20 to a compensation network 27 which includes amplifier 28. This network allows passage only of the higher frequencies and provides increased gain at higher frequencies. The signal is fed to coil 29 of torquer 15. A capacitor (not shown) in series with coil 29 prevent undesired D.-C. components from flowing in coil 29. Magnets 30 and 30a, each comprised of a north pole and a south pole, comprise the remaining member of torquer 15. Thus, the signals applied to coil 29 operate as a velocity damping device to hold mass 8 from deflecting under accelerations of higher frequencies. Increasing the viscosity of the flotation fluid (referred to hereinafter with reference to FIG. 2) is another method of obtaining velocity damping means to reduce the sensitivity to accelerations at high frequencies. Increasing the moment of inertia of the pendulum will also act to reduce the sensitivity to high frequency accelerations. As a result, deflections of lower frequencies are kept to a minimum by the response of motor 1, and deflections of the remaining higher frequencies are kept to a minimum by the damping device. There are, therefore, in the embodiment illustrated, two closed loop servo circuits. The speed of rotation of motor 1 is an indication of acceleration. The shaft position of motor 1, or the number of revolutions read on counter 25, is an indication of the velocity of the device.

The device operates as an integrating device and other uses may be found for its integrating capabilities. If, for example, the device is not experiencing acceleration and pendulous arm 8 is deflected by some other force or torque, the speed of motor 1 will indicate the amount of force or torque applied to arm 8, and the number read on counter 25 will indicate the integral with respect to time of this force or torque. In such an instance, disc 9 may be exactly balanced by weight 12 and be a pivotal mass instead of an eccentrically mounted mass. And in this instance, illustrated in FIG. 3, the magnets may be mounted to rotate around the axis of rotation of disc 9.

FIG. 2 is an illustration in cross section of a typical embodiment of the device of the invention. Motor 1 drives gear 1 which in turn drives gear 3. Shaft 4 is bearing mounted with respect to the case and is attached to aluminum hub 31 to which is firmly attached magnet cluster 6. A similar aluminum hub 32 mounts magnet cluster 7. Under temperature variations, the magnetic field of the magnets 6 and 7 may vary considerably. Aluminum hubs 31 and 32 are a method of compensating for this variation in magnet strength with temperature. The thermal coefficient of expansion of hubs 31 and 32 and the shape of the hub compensate for the change in magnetic strength by varying the distance between the magnets at different temperatures. A practically linear output is obtained despite variations in temperature.

Pivotal mass 8 in FIG. 2 is immersed in a fluid-tight compartment and is mounted on shaft 35 by a fluid bearing. A pump 33 provides fluid, such as a petroleum oil or a fluorinated hydrocarbon, to conduit 34 which extends down the center of shaft 35 and floats hub 36 with respect thereto. Pivotal mass 8 lies in a fluid-tight chamber 37. A return conduit means 38 is connected from chamber 37 to pump 33. Disc 9 lies in the portion of chamber 37 which extends between magnet clusters 6 and 7. Shaft 4 passes through a hole in disc 9 with a clearance which is greater than the maximum deflection which the mass 8 will experience.

Disc 9 is preferably made from materials, such as aluminum or copper, with good electrical and thermal conductivity. The higher the conductivity the higher is the available torque, hence the higher can be the pendulosity of mass 8. Known metals and alloys with high conductivity also have a high rate of change of conductivity with temperature, which can directly affect the output scale factor of the instrument. Some means must be provided for compensating for this change in conductivity with temperature, to allow use of high conductivity nonmagnetic materials. This is achieved in the device, such as FIG. 1, by designing to compensate for the change. Certain fluids, such as those suggested, have a suitable rate of change of density with temperature to compensate for this. The idea is then to use a fluid which changes the buoyancy and thus the pendulosity of the eccentrically mounted mass to compensate exactly for the change in conductivity of the disc.

The computation for the correct relations so that the change in buoyancy will compensate for the change in conductivity with temperature is as follows:

$$L = Mr_1\ddot{x} - \rho V r_2 \ddot{x} \qquad (1)$$

where $L=$ the torques acting on a pivotal mass accelerating in a fluid
$M=$ the mass suspended
$r_1=$ distance from the pivot point to the center of gravity of the mass
$\ddot{x}=$ acceleration in the sensitive direction
$V=$ volume of the mass suspended in the fluid
$r_2=$ distance from the pivot point to the center of buoyancy
$\rho=$ fluid density An equal and opposite torque must be provided by the magnets inducing current in the eddy-current disc so as to hold the pendulum undeflected:

$$L_i = K\frac{\omega}{r} = L \qquad (2)$$

where $L_i=$ torque created by induction
$K=$ a constant
$\omega=$ angular velocity of the magnets
$r=$ coefficient of resistivity of the disc Setting Equation 1 equal to 2 and solving for $$\frac{\ddot{x}}{\omega}$$

which is acceleration divided by angular velocity of the magnets (which should remain a constant so as to give a constant scale factor):

$$Mr_1\ddot{x} - Vr_2\rho\ddot{x} = K\frac{\omega}{r} \qquad (3)$$

$$\frac{\ddot{x}}{\omega}(Mr_1 - Vr_2\rho) = \frac{K}{r} \qquad (4)$$

$$\frac{\ddot{x}}{\omega} = \frac{K}{r(Mr_1 - Vr_2\rho)} = \text{Constant} \qquad (5)$$

Under temperature variation, the following must be true if the ratio in Equation 5 is to remain a constant:

$$r(Mr_1 - Vr_2\rho) = \text{Constant} \qquad (6)$$

The resistivity $r$ is:

$$r = r_0(1 + at) \qquad (7)$$

where
$r_0$ = resistivity with no change in temperature
$a$ = temperature coefficient of resistivity
$t$ = change in temperature
and $$\rho = \rho_0(1 - bt) \qquad (8)$$

where
$\rho_0$ = initial density with no change in temperature
$b$ = temperature coefficient of fluid density Substituting 7 and 8 in 6

$$r_0(1+at)[Mr_1 - Vr_2\rho_0(1-bt)] = \text{Constant} \qquad (9)$$
$$[r_0 + r_0at][Mr_1 - Vr_2\rho_0 + Vr_2\rho_0 bt] = \text{Constant} \qquad (10)$$
$$[r_0Mr_1 - r_0Vr_2\rho_0 + R_0Vr_2\rho_0 bt + R_0atMr_1$$
$$- r_0atVr_2\rho_0 + r_0atVr_2\rho_0 bt] = \text{Constant} \qquad (11)$$

Taking the derivature and setting it equal to zero to solve for the case in which the equation is a constant:

$$r_0Vr_2\rho_0 dbt + r_0aMr_1 dt - r_0aVr_2\rho_0 dt$$
$$+ r_0aVr_2\rho_0 b2t dt = 0$$

Removing the common factor $r_0$ and $dt$ and neglecting the smaller term:

$$Vr_2\rho_0 b + aMr_1 - aVr_2\rho_0 = 0$$

$$Vr_2\rho_0(b - a) = -aMr_1$$

$$\frac{Vr_2\rho_0}{Mr_1} = \frac{a}{a - b} \qquad (12)$$

Equation 12 illustrates what the parameters of volume, $r_2$, $\rho_0$, mass and $r_1$ must be with respect to each other in order that the thermal coefficients of resistivity and fluid density, $a$ and $b$, compensate for each other. It will be noted that $Vr_2\rho_0$ is the buoyancy pendulosity of the pivotal mass 8, and $Mr_1$ is its mass pendulosity. It may be appreciated that volume pendulosity would then be $Vr_2$. Volume pendulosity bears, of course, a predetermined relationship to buoyancy pendulosity, the relationship being the density of the fluid, $\rho$. Therefore, Equation 12 expresses the relationship of buoyancy pendulosity with respect to mass pendulosity if temperature compensation is to be achieved. The compensation is that in which the change in disc conductivity due to temperature is compensated for by the change in fluid density.

FIG. 4 illustrates alternative locations of magnets and the eddy-current element. FIG. 4 illustrates a motor 1 rotating an eddy-current drag cup 39 which rotates in proximity to magnet 40, which is mounted by a low-friction bearing, such as a fluid bearing, with respect to case 41. A mass unbalance 42 causes magnet 40, floated in a fluid 43, to rotate slightly under acceleration, and pickoff 14 provides a signal to the servo controller 44 which controls the speed and response of motor 1.

The servo loop of FIG. 1 is an illustration in greater detail of such servo control.

In each of the mentioned cases, the pivotal mass is maintained by a servo loop at substantially zero deflection. And, in addition, temperature compensation may be obtained by using either thermal coefficient of expansion or buoyancy control, or both, as previously explained.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A singly integrating precision acceleration sensitive device comprising a case adapted for fixed attachment to a base, an electrically conductive member, a magnet member, one of said members being pivotally mounted to said case, the other of said members being mounted to the case for rotation in proximity to said one member about an axis spaced from the axis of pivotal mounting of said one member, a servo motor on the case connected to rotate said other member, a pickoff for sensing deflection of the pivotally mounted element relative to the case, and controller means energized from the pickoff for driving the motor with a velocity such as to null the deflection of the pivotally mounted element.

2. A singly integrating precision acceleration sensitive device comprising a case adapted for fixed attachment to a base, means including a septum for providing a sealed liquid-filled chamber in the case, an electrically conductive member, a magnet member, one of said members being pivotally mounted to said case within said chamber, the other of said members being mounted to and within the case externally of said chamber for rotation in proximity to said one member, said septum being interposed between said members to avoid viscous liquid coupling between said members, a servo motor on the case connected to rotate said other member, a pickoff for sensing deflection of the pivotally mounted element relative to the case, and controller means energized from the pickoff for driving the motor with a velocity such as to null the deflection of the pivotally mounted element.

3. A device comprising a motor, a permanent magnet connected to be rotated by said motor, a mass eccentrically mounted about a pivotal axis so as to be rotatable under the influence of translational acceleration, the axes of rotation of said magnet and said mass lying in a common plane, said mass comprising an eddy-current element disposed in the magnetic field of said permanent magnet, and wherein is further included pickoff means disposed to indicate the deflections of said pivotal mass, the signal provided by said pickoff means varying in frequency in accordance with the frequency of the deflections of said mass, means for controlling the speed of said motor in response to the frequencies produced by said pickoff means, torquer means connected to receive the output of said pickoff means and responsive at least to signal frequencies received from said pickoff means above the frequency response capabilities of said motor, said torquer means disposed to torque said pivotal mass.

4. A device comprising a motor, a first element connected to be rotated by said motor, a second element whose mass is eccentrically mounted about a pivotal axis, a fluid, said second element disposed in said fluid, one of said elements comprising means providing a magnetic field, and the other of said elements comprising an eddy-current element disposed in said magnetic field, the buoyancy pendulosity and the mass pendulosity of said second element having predetermined relationship related to the temperature coefficient of resistivity of said eddy-current element in said magnetic field and the temperature coefficient of fluid density of said fluid so as to compensate for the effects of temperature on said device.

5. A device comprising a motor, a first element connected to be rotated by said motor, a second element whose mass is eccentrically mounted about a pivotal axis, a fluid, said second element disposed in said fluid, one of said elements comprising means providing a magnetic field, and the other of said elements comprising an eddy-current element disposed in said magnetic field, the buoyancy pendulosity, and the mass pendulosity of said second element having predetermined relationship so as to compensate for the effects of temperature on said device, and wherein the predetermined relationship of buoyancy pendulosity to mass pendulosity is equal to the ratio of the temperature coefficient of resistivity of said eddy-current disc divided by the difference between the temperature coefficient of resistivity of said disc and the temperature coefficient of fluid density of said fluid.

6. The combination recited in claim 4 wherein is included thermal expansion means mounting one of said means providing a magnetic field and said eddy-current element, whereby the proximity of said means and said eddy-current element varies in accordance with temperature so as to compensate for the variation in magnetic field strength of said means providing a magnetic field with temperature variation.

7. A device comprising a motor, a first element connected to be rotated by said motor, a second element whose mass is eccentrically mounted about a low-friction pivotal axis, one of said elements comprising means providing a magnetic field, and the other of said elements comprising an eddy-current conductor disposed in said magnetic field, a fluid, said second element immersed in said fluid, pickoff means disposed to indicate the deflections of said pivotal mass, means for controlling the speed of said motor in response to said pickoff means, the volume pendulosity of said second element having a predetermined relationship to the mass pendulosity of said second element said relationship being related to the temperature coefficient of resistivity of said eddy-current conductor disposed in said magnetic field and the temperature coefficient of fluid density of said fluid whereby said device is temperature compensated.

8. The combination recited in claim 7 wherein is further included torquer means connected to receive the output of said pickoff means, said pickoff means providing a signal varying in frequency as the variation in frequency of deflection of said pivotal mass said torquer means responsive at least to signal frequencies received from said pickoff above the frequency response capabilities of said motor, said torquer means disposed to torque said second element.

9. A device comprising a motor, a permanent magnet connected to be rotated by said motor, a pivotal element whose mass is eccentrically mounted about an axis, a fluid surrounding said pivotal element, said element further comprising an eddy-current element disposed in the magnetic field of said permanent magnet, low-friction bearing means mounting said pivotal element, pickoff means disposed to indicate the deflections of said pivotal element, means for controlling the speed of said motor in response to said pickoff means, the buoyancy pendulosity and the mass pendulosity of said pivotal element bearing a predetermined relationship related to the temperature coefficient of resistivity of said eddy-current element and the temperature coefficient of fluid density of said fluid, whereby said device is temperature compensated.

10. The combination recited in claim 9 wherein is included torquer means connected to receive the output of said pickoff, said pickoff means providing a signal varying in frequency in accordance with the frequency of deflection of said pivotal element said torquer means responsive at least to signal frequencies received from said pickoff above the frequency response capabilities of said motor, said torquer means disposed to torque said pivotal mass.

11. An acceleration responsive device comprising a motor, a permanent magnet connected to be rotated by said motor, a mass eccentrically mounted about a pivotal axis so as to be rotatable under the influence of acceleration, said mass comprising an eddy-current element disposed in the magnetic field of said permanent magnet, pickoff means disposed to indicate the deflections of said pivotal mass, means for controlling the speed of said motor in response to the signal produced by said pickoff means, torquer means connected to receive the output signal of said pickoff means, said torquer means being responsive only to alternating components of said pickoff signal, said torquer means being disposed to torque said pivotal mass.

12. An acceleration responsive device comprising a motor, a permanent magnet connected to be rotated by said motor, a mass eccentrically mounted about a pivotal axis so as to be rotatable under the influence of acceleration, said mass comprising an eddy-current element disposed in the magnetic field of said permanent magnet, pickoff means disposed to indicate the deflections of said pivotal mass, means for controlling the speed of said motor in response to the signal produced by said pickoff means, torquer means connected to receive the output signal of said pickoff means, said torquer means capable of responding more rapidly than said motor to changes in pickoff signal, said torquer means disposed to torque said pivotal mass and wherein said torquer means is further relatively unresponsive to the constant or varying signals from said pickoff within the response capabilities of said motor.

13. An acceleration responsive device comprising a motor, a permanent magnet connected to be rotated by said motor, a mass eccentrically mounted about a pivotal axis so as to be rotatable under the influence of acceleration, said mass comprising an eddy-current element disposed in the magnetic field of said permanent magnet, pickoff means disposed to indicate the deflections of said pivotal mass, means for controlling the speed of said motor in response to the signal produced by said pickoff means, torquer means connected to receive the output signal of said pickoff, said torquer means responsive to frequencies of said pickoff signal at which said motor response is insufficient to maintain said pendulum substantially undeflected.

14. In a device compensated for temperature sensitivity, said device comprising an eccentrically and pivotally mounted mass, torquing means including electrically conductive means cooperating with said mass to apply a force thereto, said device being sensitive to temperature by reason of the temperature coefficient of resistivity of said electrically conductive means a liquid in which said pivotally mounted mass is immersed, the buoyancy pendulosity and the mass pendulosity of said pivotally mounted mass bearing a predetermined relationship in accordance with the temperature coefficient of resistivity of said electrically conductive means and the temperature coefficient of fluid density of said liquid.

15. In a device compensated for temperature sensitivity, said device comprising an eccentrically and pivotally mounted mass, a fluid in which said pivotally mounted mass is immersed, the buoyancy pendulosity and the mass pendulosity of said pivotally mounted mass bearing a predetermined relationship, and wherein said predetermined relationship is that said buoyancy pendulosity bears the same relationship, with respect to the mass pendulosity as the temperature coefficient of said mass bears to the difference between said temperature coefficient of said mass and the temperature coefficient of density of said liquid.

16. A singly integrating measuring instrument comprising a case, an apertured eddy-current member eccentrically pivoted to the case, a shaft rotatably mounted to the case and freely extending through said apertured member, a pair of magnets fixed to the shaft for rotation therewith in proximity to and on either side of said eddy-current member, a servo motor on the case connected to drive the shaft, a pickoff for detecting pivotal deflection of said eddy-current member, and a servo controller connected between the pickoff and motor.

17. The instrument of claim 16 wherein the case includes means providing a sealed liquid retaining chamber therein, said eddy-current member being mounted within the chamber and said magnets being mounted within the case externally of the chamber.

References Cited in the file of this patent

UNITED STATES PATENTS

| | | |
|---|---|---|
| 1,672,189 | Zubaty | June 5, 1928 |
| 1,721,853 | Boykow | July 23, 1929 |
| 2,099,849 | Holmes | Nov. 23, 1937 |
| 2,361,790 | Noxon | Oct. 31, 1944 |
| 2,429,612 | Curry | Oct. 28, 1947 |
| 2,590,428 | Noxon | Mar. 25, 1952 |
| 2,640,166 | Zozulin et al. | May 26, 1953 |
| 2,761,080 | Akeley | Aug. 28, 1956 |
| 2,801,097 | Adamson | July 30, 1957 |
| 2,853,287 | Draper et al. | Sept. 23, 1958 |
| 2,933,298 | Allison | Apr. 19, 1960 |